UNITED STATES PATENT OFFICE.

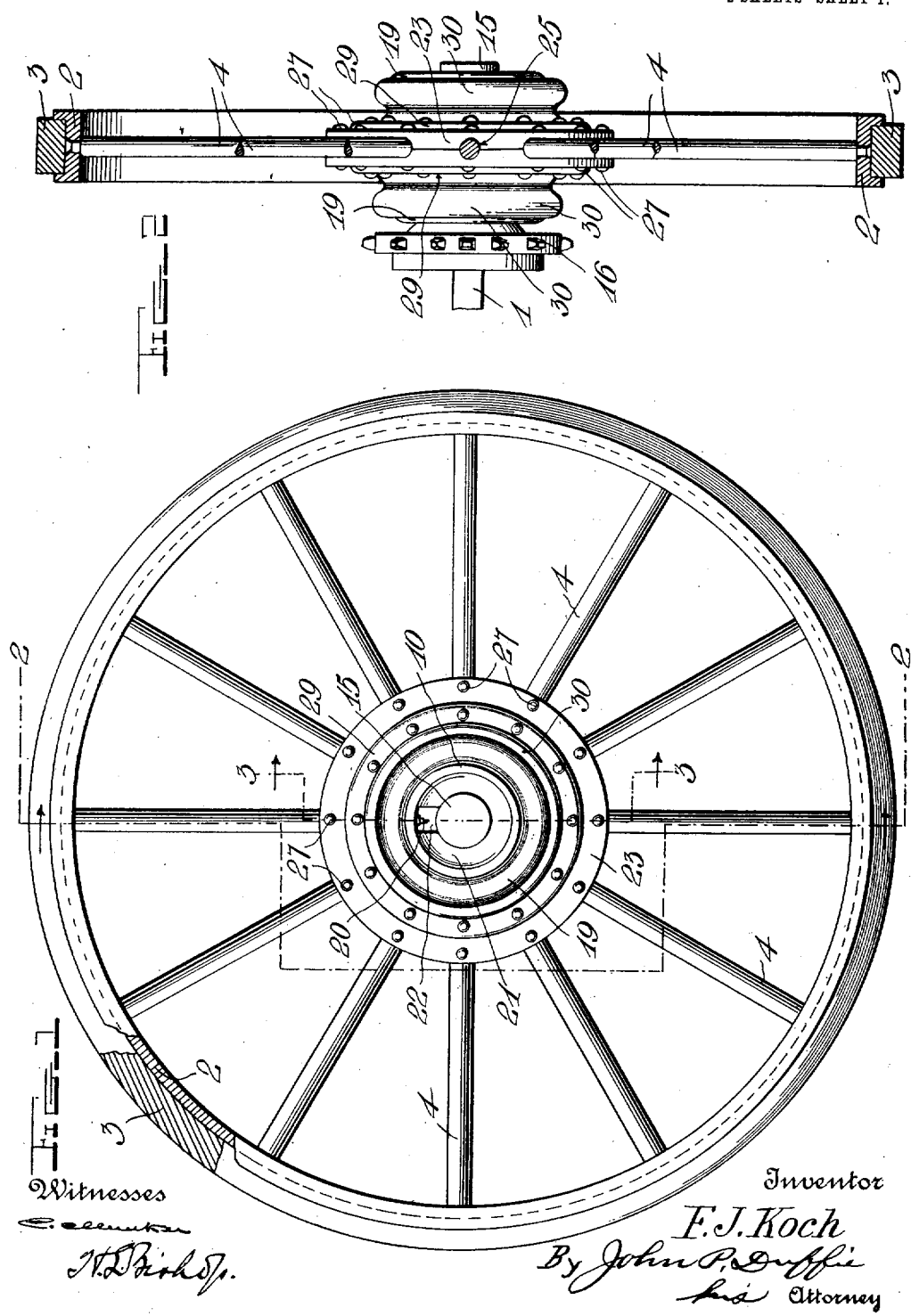

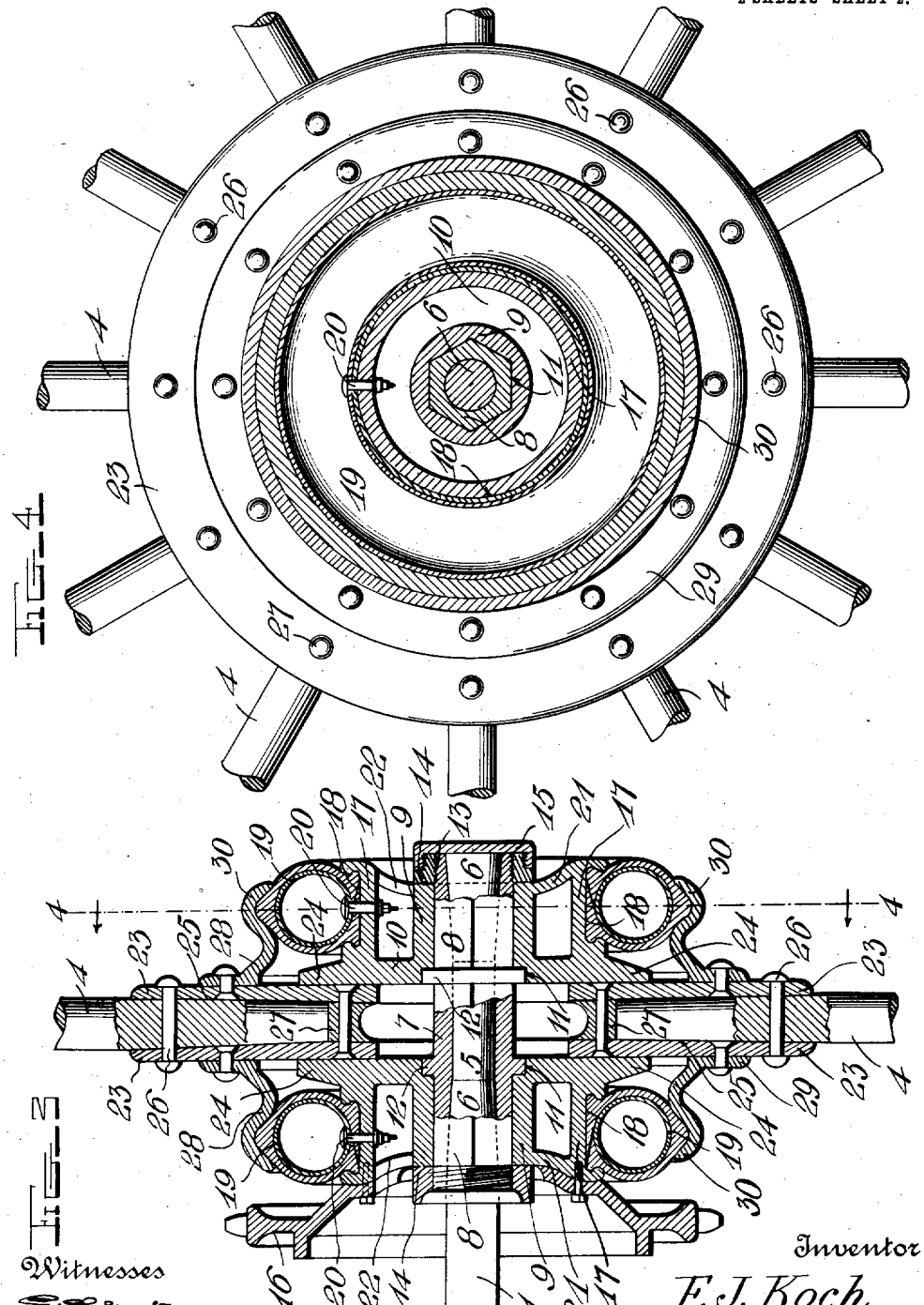

FRED J. KOCH, OF EAST ST. LOUIS, ILLINOIS.

PNEUMATIC WHEEL-HUB.

1,018,428.  Specification of Letters Patent.  Patented Feb. 27, 1912.

Application filed March 19, 1910. Serial No. 550,460.

*To all whom it may concern:*

Be it known that I, FRED J. KOCH, a citizen of the United States, residing at 1909 Baugh avenue, East St. Louis, in the county of St. Clair and State of Illinois, have invented certain new and useful Improvements in Pneumatic Wheel-Hubs, of which the following is a specification.

This invention relates to new and useful improvements in pneumatic wheel hubs.

The primary object of this invention is to provide a pneumatic hub for vehicle wheels which will make possible the use of solid tires for the rims of the wheels and, at the same time afford approximately the same resiliency as would be present were the wheels equipped with tires of the pneumatic type. It will thus be seen that by using my pneumatic hub, while breakdowns due to punctures are avoided, the same resiliency and easy riding is insured as through the use of pneumatic tires.

With the foregoing and other objects in view the invention consists in the novel construction, combination and arrangement of parts illustrated in the drawings and more particularly pointed out in the appended claim.

In the accompanying drawings:—Figure 1 is a side elevation of the vehicle wheel provided with my pneumatic hub. Fig. 2 is a vertical transverse section taken on the line 2—2 of Fig. 1. Fig. 3 is a similar view, taken on the line 3—3 of Fig. 1 with the parts shown on an enlarged scale. Fig. 4 is a vertical transverse section, taken on the line 4—4 of Fig. 3 and looking in the direction indicated by the arrows.

Referring to the drawings for a more particular description of the invention, which are for illustrative purposes only and are therefore not drawn to scale, the numeral 1 indicates the axle, 2 the rim, 3 the solid tire, and 4 the spokes, which may be of any ordinary or approved construction and form no part of this invention. The end of the axle 1 is provided with the reduced cylindrical portion 5 having the outwardly flared or tapering portions 6. A bushing 7 having its interior formed to receive the bearing portion of the axle 1, is mounted thereon. This bushing is provided with the polygonal end portions 8 which receive the correspondingly shaped hub portions 9 of the castings 10. The inner ends of the hub portions 9 are suitably recessed, as at 11, to receive polygonal shoulders 12 formed at the junction of the central and end portions of the bushing 7, the purpose of which is to hold the castings against lateral displacement inwardly. The outer ends of the polygonal portions 8 of the bushing 7 are cylindrical and provided with exterior threads 13 upon which are screwed the rings or collars 14 which fit against the outer ends of the hub portions 9 and hold the latter in removable position. A cap 15 also screws on the outer collar 14 against said ends of the axle and bushing. A sprocket gear 16 is screwed or otherwise attached to the hub portion of the inner casting 10 by means of which power may be communicated to drive the wheel. The castings 10 are further provided with the annular bearing portions 17 which surround and are concentric with the hub portions 9 and suitably recessed, as at 18, to form seats for the pneumatic tires 19. These tires may be of any ordinary and approved construction and are provided with the usual inflating valves 20 which project through the castings 10. The walls 21 between the hubs and the bearing portions 17 of the castings are suitably recessed, as at 22, to facilitate the ready inflation of the tires.

The spoke receiving member 23 which is in the form of a ring is arranged with its inner edge fitting between the outwardly extending flanges 24 of the bearing portions 17 and is provided with the spoke receiving sockets 25 which receive the inner ends of the spokes 4, the latter being secured in position by the rivets 26 passing through the spokes and the spoke receiving member. The inner ends of the spokes have a bearing against the bearing ring 27 also secured by rivets which relieves the rivets 26 of the excessive strain to which they would otherwise be subjected. The spoke receiving member 23 is resiliently supported upon the tread portions of the tires 18 by the tire engaging rings 28 comprising the inner portions 29, which are riveted to the spoke receiving member 23, and the outer tire engaging portions 30.

From the foregoing description it will readily be seen that as the wheel passes over the ground the spoke receiving member will have a yielding or sliding action between the castings 10 due to the weight borne by the wheel. It will also be observed that when the wheel passes over any obstructions or irregularities in its path the spoke receiving member will momentarily have a greater yielding or sliding action and the shocks will be readily absorbed.

From the foregoing description taken in connection with the drawings it is thought that the construction and operation of the device will be readily understood without requiring a more extended explanation.

Various changes in the form, proportions and minor details of construction may be resorted to without departing from the principle or sacrificing any of the advantages of the invention as defined in the appended claim.

Having described my invention, what I claim as new and desire to secure by Letters Patent, is:—

In a vehicle wheel, an axle, a bushing thereon, a pair of castings provided with annular bearing rims non-rotatably mounted on opposite ends of the bushings, a spoke receiving member, the inner portion thereof fitting between the castings and the outer portion projecting there-beyond, pneumatic tires mounted in the bearing rims of the castings, bearing rings attached to opposite sides of the spoke receiving member and engaging the tread portions of said tires, said rings extending entirely around the wheel and a bearing ring in the spoke receiving member for the inner ends of the spokes.

In testimony whereof I affix my signature in presence of two witnesses.

FRED J. KOCH.

Witnesses:
C. E. POPE,
LIZZIE ELSPERMAN.

---

Copies of this patent may be obtained for five cents each, by addressing the "Commissioner of Patents, Washington, D. C."